United States Patent [19] — Roudeau

[11] 4,380,038

[45] Apr. 12, 1983

[54] OVERVOLTAGE PROTECTIVE MODULE

[76] Inventor: Maurice Roudeau, Résidence de la Commanderie Brelevenez, Lannion, France, 22300

[21] Appl. No.: 260,807

[22] Filed: May 5, 1981

[30] Foreign Application Priority Data

May 6, 1980 [FR] France ................................ 80 10098

[51] Int. Cl.[3] ................................ H02H 9/06

[52] U.S. Cl. ................................ 361/119; 361/118; 361/117; 339/14 P; 339/198 P

[58] Field of Search ............... 361/119, 117, 118, 124, 361/120; 337/32, 31, 33, 34, 35, 28, 18, 19, 255, 259, 263, 268, 156, 199, 228, 234; 339/14 P, 14 R, 14 RP, 198 G, 198 S, 198 P

[56] References Cited

U.S. PATENT DOCUMENTS

| | | | |
|---|---|---|---|
| 2,546,824 | 3/1951 | Koliss . | |
| 2,619,518 | 11/1952 | Kelsay | 361/124 X |
| 3,255,330 | 6/1966 | MacKenzie et al. | 361/124 X |
| 3,825,867 | 7/1974 | Georgopulos . | |

*Primary Examiner*—Patrick R. Salce

*Attorney, Agent, or Firm*—Lowe, King, Price & Becker

[57] ABSTRACT

The overvoltage protective module comprises a two-terminal overvoltage protective element positioned in a recess of an insulating body. Two conducting strips are held in the bottom of the recess and have flexible ends located one above the other below the second terminal of the element. A grounding plate, secured to a body face, has a hole crossed by the element. A detachable closing cap abuts against the first terminal of the element to drive the element into contact with a flexible end of one conducting strip by combined translation and rotation relative to the grounding plate. To ground test the circuit connected to the upper strip, an end of the upper strip is disconnected from the end of the lower strip and connected to the second terminal of the element when the cap is at an intermediate stationary position of its down stroke. The end of the upper strip is forced against the end of the lower strip by the second terminal of the element at the end of the rotation of the cap, for protecting the circuits connected to the two strips.

17 Claims, 9 Drawing Figures

OVERVOLTAGE PROTECTIVE MODULE

BACKGROUND OF THE INVENTION

1. Field of the Invention

The present invention relates to an overvoltage protective module for establishing a grounding path from a circuit, such as a line, to a grounding contact and also for testing one section of the circuit with respect to ground.

2. Description of the Prior Art

An overvoltage protective module contains an overvoltage protective or a so-called "open gap" protector to protect one wire of a line against undesirable high overvoltage, such as that which results from lightning. This wire may, for example, be formed by a pair of conductors, one of which is connected to the inner side of an exchange frame for incoming subscriber's telephone lines and an other of which is connected to a terminal of a telephone exchange. The two conductors are connected to ground via the overvoltage protector in normal operation. Thus, by definition, a protector of this type for protection against overvoltage is connected in parallel between a line wire and a grounding terminal, in contrast to overcurrent protective elements, such as fuses, which have to be connected in series on the wire line and which are not included in the scope of the present invention.

U.S. Pat. No. 2,546,824 discloses a moulded plastic block which contains a cylindrical spaced gap protector with two carbon electrodes. The terminals of the line wire are formed as helical springs which are set coaxially in the cavity of the block and exert pressure on elements of a protector assembly, thereby to normally maintain the elements of the assembly in a compactly assembled relationship. The end of a first spring which is connected to the terminal on the side of the telephone line is applied against the second terminal of the spaced gap protector by means of a metallic member. The end of a second spring which is connected to the terminal at the telephone exchange is applied against a metallic end cap which is fixed to an insulating material housing containing a coil. This cap is connected to the metallic member under the effect of the second spring via a conducting wire, a winding and a metallic sleeve which are anchored to the cap, and via a low melting-point solder between the sleeve and a coaxial pin in the block. The first terminal of the spaced gap protector is inserted in a bayonet cap whose lugs slide into the grooves of a drilled metal face plate connected to ground.

The bayonet closing means are conventional. The bayonet cap initially translated horizontally along the longitudinal axis of the spaced gap protector then it rotates in order to anchor and hold all the members in the block. The result of this is that there is no stationary position in which the spaced gap protector is only connected to the terminal of the outer circuit on the side of the telephone line and disconnected from the terminal of the inner circuit on the side of the telephone exchange, owing to the force exerted by the helical springs in the direction of the bayonet cap. Thus, the individual ground insulation of the outer circuit cannot be tested. In addition, the helical springs are required to extract the members included in the block.

U.S. Pat. No. 3,825,867 discloses an electrical protective module in which an overvoltage protective element or spark-gap device can be inserted sideways in a block of the module and comprises a terminal which is connected to a grounding terminal strap by means of a coil spring, and another terminal which is connected to an elongated terminal strap connected to a wire of a subscriber's telephone line by means of a heating coil and a side-mounted contact plate which is rigid with this coil. Interruptive means in the form of a movable detent actuator made of insulating material may slide between the contact plate and the contact end surface of an elongated strap forming another terminal of the line. Thus, in the absence of the detent actuator, the line is closed regardless of whether the gap-spack device is present or not. When the detent actuator is inserted, it interrupts the electrical conductive path between the terminals of the line wire. In addition, the terminal strap associated with the subscriber's line is permanently connected to the spark-gap device.

OBJECT OF THE INVENTION

The main object of the present invention is to provide an overvoltage protective module having a simple and cheap arrangement that enables the line wire to be protected against overvoltage in normal operation or the line wire to be interrupted in the absence of the overvoltage protector, and enables the individual grounding insulation of one of the ends of the wire to be tested, preferably the outer side, with respect to ground.

SUMMARY OF THE INVENTION

These and other objects of the present invention are accomplished through an overvoltage protective module which comprises:

a body of insulating material having a recess;

an overvoltage protective element having first and second terminals and positioned in said recess;

two conducting strips held in the bottom of said recess and having free and flexible ends which are placed one above the other below said second terminal of said overvoltage protective element; and translation and rotation guiding means for said element including grounding means secured to a face of said body and drilled with a hole crossed by said overvoltage protective element and detachable closing means abutting against said first terminal of said overvoltage protective element and partly surrounding said grounding means;

said free end of one of said conducting strips being disconnected from said free end of the other conducting strip and connected to said second terminal of said overvoltage protective element when said closing means is at an intermediate stationary position of its stroke, and being forced against said free end of said other conducting strip by said second terminal of said overvoltage protective element at the end of the rotation of said closing means.

According to another aspect of the invention and a preferred embodiment, the translation and rotation guiding means includes at least one assembly of the bayonet joint type in which a pin is secured to said grounding means and slides into a groove of said closing means which has a rectilinear section defining the beginning of a stroke of said closing means. A circular section defines the end of the stroke of said closing means. A helical intermediate section between said rectilinear section and said circular section defines said intermediate stationary position of said closing means. According to a further embodiment, the pin may be replaced by a pin of the closing means and the groove may be replaced by a groove in the grounding means.

The advantages provided by the module embodying the invention are the protection of equipment and the ensured protection of people and the proper operation of appliances by diverting the distrubuting currents towards ground. The invention enables lines and cables to be joined and guarantees shunt protection when the circuit is established, and external protection when the circuit is interrupted. Finally, the electric circuit has no electric continuity with respect to the internal equipment when the closing means of the module is not in place.

A plurality of modules may be connected in order to form a multi-pair connecting block and to equip various appliances (frames, electrical or electronic equipments . . . ) whatever the manner of assembly may be.

The advantages for maintenance services are very great since replacing one protective element by another involves a very elementary step as well as the current interruption of the establishment of the electric circuit.

The dimensions of the module embodying the invention only depend upon the dielectric constant of the various component parts and the currents and voltages for which the assembly is intended. Suitable selection of the component parts may enable miniaturization thus offering the possibility of maximum reduction of space required.

In addition to greater operational safety, taking into account the simplicity with which an assembly of this type may be produced, a relatively low manufacturing price may also be expected in the case of mass production.

BRIEF DESCRIPTION OF THE DRAWING

Further advantages and features of the present invention will be more fully appreciated from the following detailed description of several embodiments with reference to the corresponding accompanying drawings, in which.

DESCRIPTION OF THE PREFERRED EMBODIMENTS

Figure 1:
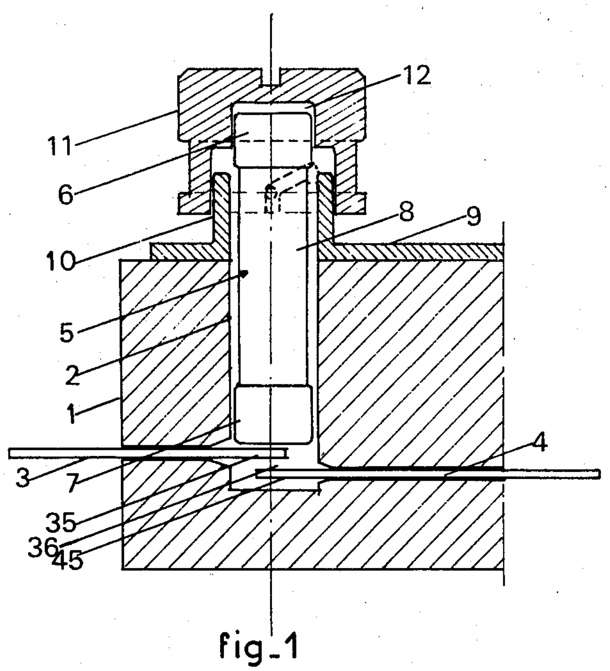
FIG. 1 is a view in partial cross section of an overvoltage protective module embodying the invention.
Figure 2:
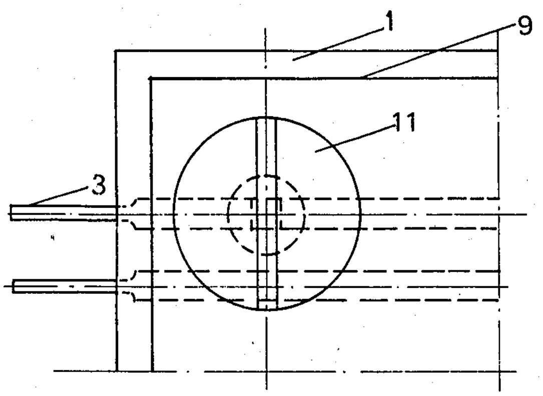
FIG. 2 is a top view of the module in FIG. 1.
Figure 4:
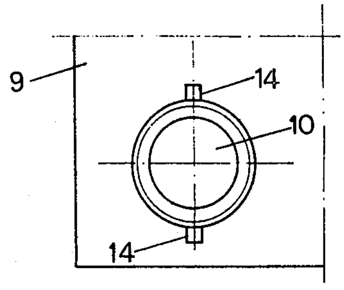
FIG. 4 is a top view of the same support member.

With reference to FIGS. 1 and 2, an individual overvoltage protective module embodying the invention comprises a body 1 of insulating material, having a vertical shaft or recess 2 generally formed as a cylindrical hole. In two lateral apertures located one above the other and extending horizontally in the two sides of the body 1, two parallel horizontal conducting strips 3 and 4 are embedded and held. The free ends of the strips 3 and 4 are flexible and have a sufficient degree of rigidity to return to their rest position, as illustrated in FIG. 1, and to ensure adequate contact pressures. In order to facilitate manufacture, the body 1 may be in two superposable parts which enclose the conducting strips 3 and 4. Adjacent ends 35 and 45 of these two strips are located one above the other in the bottom of the shaft 2 and leave a space 36 between them in the rest position. A monobloc element 5, which functions as an overvoltage protective element, is positioned in the shaft 2. This element 5 is a miniature overvoltage protector for example which is generally cylindrical in shape and having cylindrical metal bases which constitute first and second electrical terminals 6 and 7 which are separated by a cylindrical insulator 8. On the upper face of the body 1 is secured a grounding metal plate 9 which is used as a permanent path for undesired currents to ground. A tubular metallic support member 10 is joined to the metal component 9 or forms part thereof and projects coaxially above the shaft 2.

A cylindrical detachable closing member or cap 11 covers both the first electrical terminal 6 of the monobloc overvoltage protective element 5 and the tubular support member 10. The cap 11 may be made of metal in order to ensure electrical connection from the first terminal 6 of the element 5 to the grounding plate 9. In this case, it is not necessary for electrical terminals 6 and 7 of the element 5 to slide with an exact fit in the support member 10 and the shaft 2. However, in accordance with another embodiment, the cap 11 is made from an insulating material and the first terminal 6 of the protection element 5 slides with an exact fit in the bored hole of the support member 10 at least before the second terminal 7 comes into electrical contact with the end 35 of the upper strip 3.

In all cases, the terminal 6 of the overvoltage protective element is engaged with a comfortable fit in a central cavity 12 of the head of the closing member 11. The second terminal 7 of the protective element 5 may simply rest on the free internal end 35 of the upper strip 3 without this end 35 coming into contact with the free internal end 45 of the lower strip 4. However, in accordance with another preferred embodiment, the upper end part 6 of the element 5 may be retained by a fastening circlip 13 (FIG. 6) in such a way that any manipulation of the closing member 11 moves the element 5 but such that it is possible to extract the element from the closing member by pulling manually.

Figure 3:
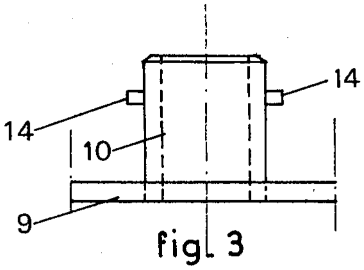
FIG. 3 is a lateral elevation of the support member of the closing member.
Figure 6:
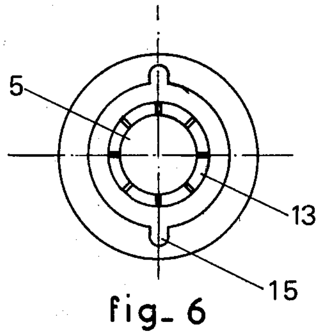
FIG. 6 is a bottom view of the same closing member.
Figure 5:
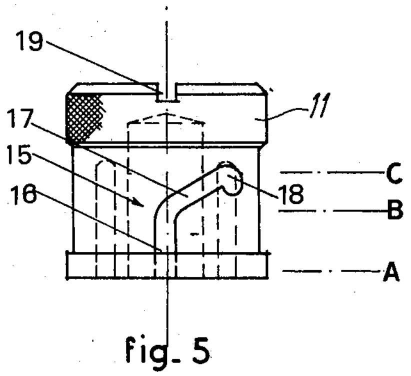
FIG. 5 is a side view of the closing member.

As shown in FIGS. 3 and 6, the guiding means for the translatory and rotation movement of the closing member 11 on the support member 10 is an assembly of the bayonet joint type and is formed by two protruding pins 14 on the outer wall of the support member 10 and by two symmetrical grooves 15 which are machined in the inner wall of the closing member 11 in such a way that they are adapted to engage the pins 14. Each groove 15 of a bayonet joint has a downwardly depending rectilinear section 16 which is parallel to the vertical longitudinal axis of the closing member 11 and which is used to translate this member 11 longitudinally and vertically. Grove 15 includes a small upper circular, horizontal stopping section 18 which guides the rotational movement of the closing member 11 at the end of its downward stroke. Between the lower rectilinear section 16 and the upper circular section 18, the groove 15 has a helical intermediate section 17 of approximately one quarter turn for the combined translation and rotation movement of the closing member 11. It will be observed that a reciprocal bayonet joint assembly may be provided instead of the afore-mentioned one; the reciprocal bayonet assembly includes at least one groove which is placed in the external surface of the support member 10, and which has a profile which is symmetrical with that of the groove 15 with respect to the horizontal (plane B of FIG. 5) and which cooperates with a protruding pin inside the closing member 11. Likewise, the helical section 17 may be formed by an internal thread in the bore of the closing member 11 which cooperates with an external thread of the support member 10, resp. by an external thread around the support member 10 which cooperates with an internal thread in the bore of the closing member 11. Closure member 11, once it has engaged the support member 10, in which the overvoltage protective element 5 is housed, may occupy three stationary positions:

One "rest" position defined by the beginning of the vertical sliding of the lower rectilinear sections 16 of the grooves 15 on the pins 14. This position corresponds with "level A" in FIG. 5. In this position, the ends 35 and 45 of the conducting strips 3 and 4 are not in electrical contact and the second electrical terminal 7 of the element 5 is not in electrical contact with the end 35 of the upper strip 3. This same "rest" position may also be obtained when the closing member 11 with the overvoltage protective element 5 is not in place on the support member 10 of the closing member;

One "circuit broken" position which is defined by the beginning of the sliding of the helical intermediate sections 17 on the pins 14. In the circuit broken position, the second electrical terminal 7 of the overvoltage protective element bends the end 35 of the upper strip 3 with contact pressure which is sufficient, for there is no electrical contact of the end 35 of the upper strip 3 with the end 45 of the lower strip 4. This position is practically that which is illustrated in FIG. 1; it corresponds to "level B" in FIG. 5 and enables the individual insulation of one of the ends of the line wire connected to the strip 3 to be tested with respect to ground through the current path constituted by the elements 3, 5, and eventually closing member 11, and metal plate 9;

One "circuit made" position is obtained by depressing the closing member 11 and rotating it by one quarter turn, which causes the pins 14 to engage the small circular stopping sections 18. In this position, which corresponds to "level C" in FIG. 5, the ends 35 and 45 of two strips 5 and 6 are in contact; the end 35 of the upper strip 3 is interposed between the second terminal 7 of the overvoltage protective element 5 and the end 45 of the lower strip 4 in a sandwiched configuration.

The down moving from the "circuit broken" position to the "circuit made" is obtained either manually or by the action of a screw-driver in a slot 19 which is made in the head of the closing member or cap 11.

Figure 7:
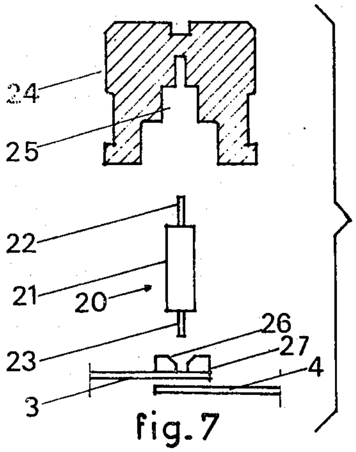
FIG. 7 is an exploded view in partial cross section of another embodiment of the invention, incorporating an overvoltage protective element which is different from that shown in the preceding FIGS.

In accordance with a further embodiment of the invention illustrated in FIG. 7, an overvoltage protective element 20 having a cylindrical insulating body 21 and two terminal electrodes 22 and 23, having the same function as the electrical terminals 6 and 7 of the overvoltage protective element 5 in FIG. 1, but with a slightly different form. The element 20 is covered by a closing member 24 having an interior central cavity 25 which a profile such that the element 20 may be inserted therein and held there if necessary by any suitable means, a circlip for example, not shown here. The upper face of conducting strip 3 carries two symmetrical bosses 26 and 27 which, together, define an axial guidance aperture and ensure the guidance and good electric contact with the second electrode 23 when the closing member 24 is actuated in order to take up either the "circuit broken" position, or the "circuit made" position, both of which are described above.

A plurality of individual overvoltage protective modules embodying the invention may be assembled into a parallelepipedal connecting block in order to enable a cut-off connection and an overvoltage protection for a large number of circuits, with two modules per pair of conducting strips 3–4 which are connected to the ends of two external side wires and two internal side wires. The block constitutes a one-piece block and is substituted by the bodies 1 of the modules of FIG. 1. The one-piece block is an insulating housing having an upper face in which are drilled vertical spaced shafts or recesses 2; each shaft encloses an overvoltage protective element 5, the first terminal 6 of which is covered by a cylindrical closing member 11. A drilled single grounding plate 9 is common to all the "modules" of the block.

Figure 8:
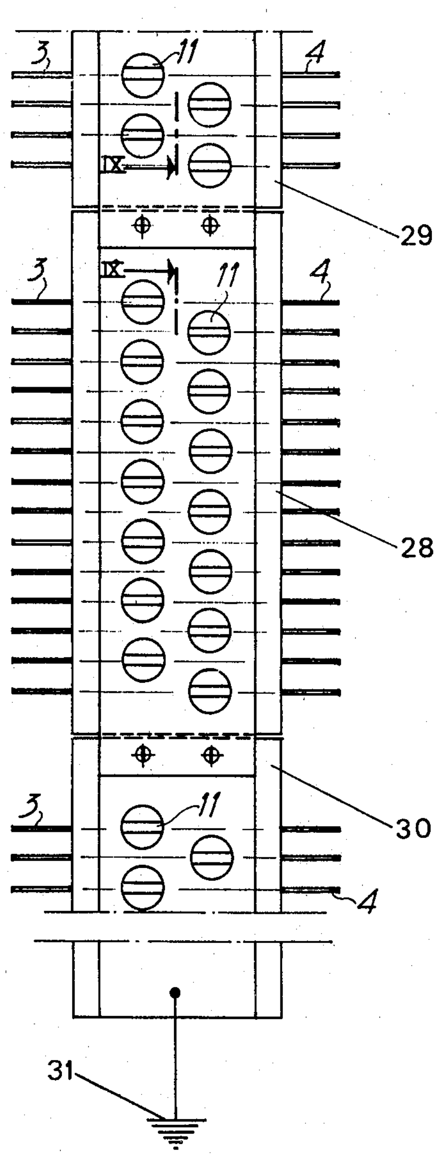
FIG. 8 is a top view of a connecting block incorporating a plurality of protective elements embodying the invention.
Figure 9:
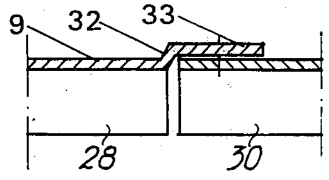
FIG. 9 is a sectional view along the line IX—IX of FIG. 8.

FIG. 8 is an illustration of a multi-pair connecting block 28 of this type which comprises fourteen "modules" for connecting fourteen circuits from the external side by the strips 3 to fourteen circuits from the internal side by the strips 4. In FIG. 8 are also shown, in part, two further multi-pair connecting blocks 29 and 30 which are disposed on both vertical small sides of the block 28, the latter block being connected to a grounding terminal 31, as shown in FIG. 9. The conducting path to ground from one block to another is ensured by covering the end of the metal plate 9 of one block 30 by the adjacent end of the metal plate 9 of the preceding block 28, owing to a shoulder 32 and an extension 33. The height of the shoulder 32 is substantially equal to the thickness of the metal plate 9. Assembly may be carried out by screws or any other suitable securing means. There is thus continuity of current flowing to ground between the conducting plates 9 to the grounding terminal connection 31.

What I claim is:

1. An overvoltage protective module comprising:

a body of insulating material having a recess;

an overvoltage protective element having first and second terminals and positioned in said recess;

two conducting strips held in the bottom of said recess and having free and flexible ends which are located one above the other below said second terminal of said overvoltage protective element; and means for guiding said overvoltage protective element, said guiding means including:

means secured to a face of said body and having a hole crossed by said overvoltage protective element for grounding said first terminal of said overvoltage protective element, and detachable closing means abutting against said first terminal of said overvoltage protective element and cooperating with said grounding means to be guided along a translatory and rotatory stroke;

said free end of one of said conducting strips being disconnected from said free end of the other conducting strip and connected to said second terminal of said overvoltage protective element when said closing means is at an intermediate stationary position of said translatory and rotatory stroke, and being forced against said free end of said other conducting strip by said second terminal of said overvoltage protective element when said closing means rotates at the end of said stroke.

2. An overvoltage protective module according to claim 1, wherein said translatory and rotatory guiding means includes at least one assembly of the bayonet joint type in which a pin is secured to said grounding means and slides into a groove of said closing means which has a rectilinear section defining the beginning of the stroke of said closing means, a circular section defining the end of said closing means stroke and a helical intermediate section between said rectilinear section and said circular section defining said intermediate stationary position of said closing means.

3. An overvoltage protective module according to claim 2, wherein said helical intermediate section of said groove is an internal thread of said closing means.

4. An overvoltage protective module according to claim 1, wherein said translatory and rotatory guiding means includes at least one assembly of the bayonet joint type in which a pin is secured to said closing means and slides into a groove of said grounding means which has a rectilinear section defining the beginning of the stroke of said closing means, a circular section defining the end of said closing means stroke and a helical intermediate section between said rectilinear section and said circular section defining said intermediate stationary position of said closing means.

5. An overvoltage protective module according to claim 4, wherein said helical intermediate section of said groove is an external thread of said grounding means.

6. An overvoltage protective module according to claim 1, wherein said two conducting strips are embedded in said body of insulating material.

7. An overvoltage protective module according to claim 1, wherein said two conducting strips are inserted between two superposable parts of said body of insulating material.

8. An overvoltage protective module according to claim 1, wherein said second terminal of said overvoltage protective element is guided at the end of the stroke thereof in an aperture of said free and flexible end of the conducting strip below said second terminal.

9. An overvoltage protective module according to claim 1 comprising fastening means, for securing said overvoltage protective element to said closing means.

10. An overvoltage protective module according to claim 1, wherein said grounding means has a shoulder having a height which is substantially equal to the thickness of said grounding means and an extension for partly covering the grounding means of another overvoltage protective module.

11. An overvoltage protective module according to claim 1, or 8, or 9, wherein said closing means is of insulating material and said first terminal of said overvoltage protective element slides with a comfortable fit into said hole of said grounding means.

12. An overvoltage protective module according to claim 1, or 8, or 9, wherein said closing means is metallic.

13. An overvoltage protective module comprising:

a body of insulating material having a recess;

an overvoltage protective element having first and second terminals and positioned in said recess;

two conducting strips embedded in said body, held in the bottom of said recess and having free and flexible ends located one above the other below said second terminal of said overvoltage protective element;

a grounding plate secured to a face of said body and having a hole which is crossed by said voltage protective element and has a protruding pin in its outer wall; and a detachable closing member having a cavity which abuts against said first terminal of said overvoltage protective element, partly surrounds said hole of said grounding plate and has an inner groove cooperating with said pin;

said groove of said closing member having a rectilinear section defining the beginning of a stroke of said closing member, a circular section defining an end of said closing member stroke and a helical intermediate section between said rectilinear section and said circular section;

said free end of one of said conducting strips being disconnected from said free end of the other conducting strip and connected to said second terminal of said overvoltage protective element when said helical intermediate section of said closing member groove contains said grounding plate pin, and being forced against said free end of said other conducting strip by said second terminal of said overvoltage protective element when said circular section of said closing member groove contains said grounding plate pin.

14. An overvoltage protective module according to claim 13, wherein said helical intermediate section of said groove is a thread of said cavity of said closing member.

15. An overvoltage protective module comprising:

a body of insulating material having a recess;

an overvoltage protective element having first and second terminals and positioned in said recess;

two conducting strips embedded in said body, held in the bottom of said recess and having free and flexible ends which are located one above the other below said second terminal of said overvoltage protective element;

a grounding plate secured to a face of said body and having a hole which is crossed by said overvoltage protective element and has at least a groove in its outer wall; and a detachable closing member having a cavity which abuts against said first terminal of said overvoltage protective element, partly surrounds said grounding plate and has a protruding pin cooperating with said groove;

said groove having a rectilinear section defining the beginning of a stroke of said closing member, a circular section defining an end of said closing member stroke and a helical intermediate section between said rectilinear section and said circular section;

said free end of one of said conducting strips being disconnected from said free end of the other conducting strip and connected to said second terminal of said overvoltage protective element when said helical intermediate section of said grounding plate groove contains said closing member pin, and being forced against said free end of said other conducting strip by said second terminal of said overvoltage protective element when said circular section of said grounding plate groove contains said closing member pin.

16. An overvoltage protective module according to claim 15, wherein said helical intermediate section of said groove is a thread in said outer wall of said grounding plate.

17. An assembly of overvoltage protective elements for protection of a plurality of line wires comprising:

a body of insulating material having a plurality of individual spaced recesses, in each of which is positioned one of said overvoltage protective elements having first and second terminals, and in the bottom of each of which are held two conducting strips having free and flexible ends which are located one above the other below said second terminal of said overvoltage protective element;

grounding means secured to a face of said body and having a plurality of holes, each of which is crossed by one of said overvoltage protective elements; and a detachable closing means for each overvoltage protective element cooperating with said grounding means through translatory and rotatory movement, abutting against said first terminal of said element and partly surrounding the respective hole of said grounding means;

said free end of one of said two conducting strips for each overvoltage protective element being disconnected from said free end of the other conducting strip and connected to said second terminal of said element when the closing means for said element is at an intermediate stationary position of a stroke, and being forced against said free end of said other conducting strip by said second terminal of said overvoltage protective element at an end of the rotation of said closing means for said element.

* * * * *